United States Patent Office 3,321,474
Patented May 23, 1967

3,321,474
DISUBSTITUTED ISOXAZOLE COMPOUNDS
AND NON-TOXIC SALTS THEREOF
Hideo Kano, Kyoto-shi, Ikuo Adachi and Ryonosuke
Kido, Toyonaka-shi, and Katsumi Hirose, Nishinomiya-
shi, Japan, assignors to Shionogi & Co., Ltd., Higashi-
ku, Osaka, Japan
No Drawing. Filed Oct. 8, 1965, Ser. No. 494,254
Claims priority, application Japan, July 31, 1963,
38/41,224; Nov. 29, 1964, 39/61,521; Aug. 20,
1965, 40/50,957
16 Claims. (Cl. 260—247.5)

The present application is a continuation-in-part of co-pending application Ser. No. 348,245, filed July 21, 1964.

The present invention relates to disubstituted isoxazole compounds and non-toxic salts thereof. More particularly, it relates to disubstituted isoxazole compounds represented by the following formula:

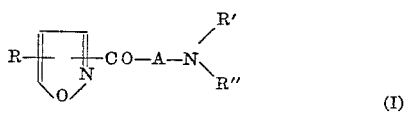

(I)

and to pharmaceutically acceptable non-toxic salts thereof.

In the above Formula I, R is a substituted or unsubstituted phenyl group and, when R is a substituded phenyl group, the substituent present on the benzene ring may be, for instance, lower alkyl (e.g. methyl, ethyl, propyl, isopropyl, butyl, isobutyl), lower alkoxy (e.g. methoxy, ethoxy, propoxy, isopropoxy, butoxy, isobutoxy) and halogen (e.g. chlorine, bromine). A is a straight or branched lower alkylene group (e.g. methylene, ethylene, propylene, isopropylene, butylene, isobutylene). R' and R'' are each a hydrogen atom or a lower alkyl group (e.g. methyl, ethyl, propyl, butyl) or, when taken together with the adjacent nitrogen atom, they present a 5- to 7-membered monocyclic heterocyclic group containing, if desired, an oxygen, sulfur or an additional nitrogen atom such as pyrrolidino, piperidino, piperazino, morpholino and thiomorpholino. That is R' and R'' may represent together a tetramethylene, pentamethylene, hexamethylene, oxatetramethylene, oxapentamethylene, oxahexamethylene, azatetramethylene, azapentamethylene, azahexamethylene, thiatetramethylene, thiapentamethylene or thiahexamethylene chain.

In its preferred aspects, the invention relates to isoxazole compounds having the structural formulae:

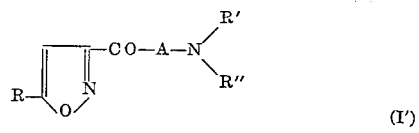

(I')

and

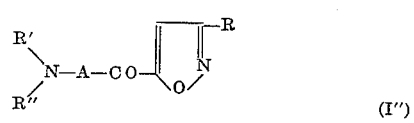

(I'')

wherein R, R', and R'' and A each has the same significance as designated above.

The objective disubstituted isoxazole compounds (I) can be prepared by interaction of halogenoalkanoyl-isoxazole compounds represented by the following formula:

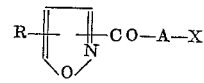

(II)

wherein X is a halogen atom (e.g. chlorine, bromine) and R and A each has the same significance as designated above with amines represented by the following formula:

(III)

wherein R' and R'' each has the same significance as designated above.

Examples of the one starting material of the present invention, namely the halogenoalkanoylisoxazole compound (II), are 3-chloroacetyl-5-phenylisoxazole,
3-bromoacetyl-5-phenylisoxazole,
3-(2-chloropropionyl)-5-phenylisoxazole,
3-(3-chloropropionyl)-5-phenylisoxazole,
3-(4-bromobutyl)-5-phenylisoxazole,
3-chloroacetyl-5-p-methylphenylisoxazole,
3-bromoacetyl-5-p-methoxyphenylisoxazole,
3-(2-chloropropionyl)-5-p-chlorophenylisoxazole,
3-(3-bromopropionyl)-5-p-bromophenylisoxazole,
3-phenyl-5-chloroacetylisoxazole,
3-phenyl-5-bromoacetylisoxazole,
3-phenyl-5-(2-chloropropionyl)-isoxazole,
3-phenyl-5-(3-chloropropionyl)-isoxazole,
3-phenyl-5-(4-bromobutyryl)-isoxazole,
3-p-methylphenyl-5-chloroacetylisoxazole,
3-p-methoxyphenyl-5-bromoacetylisoxazole,
3-p-chlorophenyl-5-(2-chloropropionyl)-isoxazole,
3-p-bromophenyl-5-(3-bromopropionyl)-isoxazole and the like.

Examples of the other starting material of the present invention, namely the amine (III), include ammonia, aliphatic primary and secondary amines such as methylamine, ethylamine, propylamine, butylamine, dimethylamine, diethylamine, dipropylamine, dibutylamine, methylethylamine and methylisopropylamine, and heterocyclic amines such as pyrrolidine, piperidine, piperazine, morpholine and thiomorpholine.

According to the process of the present invention, the interaction of the halogenalkanoylisoxazole compound (II) with the amine (III) can be carried out in an inert solvent medium at a wide range of temperature, if necessary, in the presence of a basic substance as acid eliminating agent. The inert solvent to be employed as the reaction medium may be selected, for instance, from benzene, toluene, xylene, acetone, methyl ethyl ketone and the like in consideration of the reactivity of the starting materials. Examples of the basic substance are organic bases such as pyridine bases (e.g. pyridine, picoline, lutidine, collidine) and aliphatic amines (e.g. dimethylamine, diethylamine, triethylamine) and inorganic bases such as alkali metal carbonates (e.g. sodium carbonate, potassium carbonate), alkali metal bicarbonate (e.g. sodium bicarbonate, potassium bicarbonate) and alkaline earth metal carbonate (e.g. calcium carbonate, barium carbonate). The basic substance may be used in the form of mixture, suspension or solution in the said inert organic solvent or, in the case of liquid, alone. When the starting amine (III) is liquid, the use of excess of the same may be preferred, because it can be available not only as the reagent but also as the reaction solvent and the acid eliminating agent.

Specific examples of the aminoalkanoylisoxazole compound (I) prepared by the present process are 3-dimethylaminoacetyl-5-phenylisoxazole,
3-diethylaminoacetyl-5-phenylisoxazole,
3-piperidinoacetyl-5-phenylisoxazole,
3-morpholinoacetyl-5-phenylisoxazole,
3-thiomorpholinoacetyl-5-phenylisoxazole,
3-pyrrolidinoacetyl-5-phenylisoxazole,
3-(2-dimethylaminopropionyl)-5-phenylisoxazole,
3-(2-diethylaminopropionyl)-5-phenylisoxazole,
3-(3-morpholinopropionyl)-5-phenylisoxazole,
3-(4-dimethylaminobutyryl)-5-phenylisoxazole,
3-(4-diethylaminobutyryl)-5-phenylisoxazole,
3-(4-dibutylaminobutyryl)-5-phenylisoxazole,
3-(4-piperidinobutyryl)-5-phenylisoxazole,
3-(4-pyrrolidinobutyryl)-5-phenylisoxazole,
3-phenyl-5-dimethylaminoacetylisoxazole,
3-phenyl-5-diethylaminoacetylisoxazole,
3-phenyl-5-piperidinoacetylisoxazole,
3-phenyl-5-morpholinoacetylisoxazole,
3-phenyl-5-thiomorpholinoacetylisoxazole,
3-phenyl-5-pyrrolidinoacetylisoxazole,
3-phenyl-5-(2-dimethylaminopropionyl)-isoxazole,
3-phenyl-5-(2-diethylaminopropionyl)-isoxazole,
3-phenyl-5-(3-morpholinopropionyl)-isoxazole,
3-phenyl-5-(4-dimethylaminobutyryl)-isoxazole,
3-phenyl-5-(4-diethylaminobutyryl)-isoxazole,
3-phenyl-5-(4-dibutylaminobutyryl)-isoxazole,
3-phenyl-5-(4-piperidinobutyryl)-isoxazole,
3-phenyl-5-(4-pyrrolidinobutyryl)-isoxazole,
3-dimethylaminoacetyl-5-p-methylphenylisoxazole,
3-diethylaminoacetyl-5-p-methylphenylisoxazole,
3-(3-piperidinopropionyl)-5-p-methylphenylisoxazole,
3-dipropylaminoacetyl-5-p-methoxyphenylisoxazole,
3-(3-morpholinopropionyl)-5-p-methoxyphenylisoxazole,
3-dibutylamionacetyl-5-p-chlorophenylisoxazole,
3-(3-thiomorpholinopropionyl)-5-p-bromophenylisoxazole,
3-p-methylphenyl-5-dimethylaminoacetylisoxazole,
3-p-methylphenyl-5-diethylaminoacetylisoxazole,
3-p-methylphenyl-5-(3-piperidinopropionyl)-isoxazole,
3-p-methoxyphenyl-5-dipropylaminoacetylisoxazole,
3-p-methoxyphenyl-5-(3-morpholinopropionyl)-isoxazole,
3-p-chlorophenyl-5-dibutylaminoacetylisoxazole,
3-p-bromophenyl-5-(3-thiomorpholinopropionyl)-isoxazole, etc.

The thus prepared aminoalkanoylisoxazole compounds (I) are liquid or solid in the free state. For convenience on preparation, they may be converted into their acid addition salts or quaternary salts, for instance, by treating the base with an acid such as hydrochloric, hydrobromic, hydroiodic, sulfuric, nitric, phosphoric, thiocyanic, carbonic, acetic, propionic, oxalic, citric, tartaric, succinic, salicyclic, benzoic or palimitic acid or a quaternizing agent such as methyl chloride, ethyl chloride, ethyl bromide, methyl iodide, ethyl iodide, phenethyl bromide, methyl benzenesulfonate, ethyl benzenesulfonate or methyl p-toluenesulfonate in a suitable solvent such as water, methanol, ethanol, ether, benzene and toluene. There are thus produced the corresponding hydrochloride, hydrobromide, hydroiodide, sulfate, nitrate, phosphate, thiocyanate, carbonate, acetate, propionate, oxalate, citrate, tartarate, succinate, salicylate, benzoate or palmitate, or the corresponding methyl ammonium chloride, methyl ammonium bromide, methyl ammonium iodide, ethyl ammonium chloride, ethyl ammonium bromide, ethyl ammonium iodide, methyl ammonium benzenesulfonate, ethyl ammonium benzenesulfonate or methyl ammonium p-toluenesulfonate.

The aminoalkanoylisoxazole compounds (I) and nontoxic salts thereof are useful as antipyretic, analgesic, antitussive and anti-inflammatory agents. They can be administered in a variety of per se conventional ways, e.g. in the form of tablets constituted e.g. by an effective single dose of active compound of the invention and a major proportion of a per se conventional carrier.

The following examples represent presently-preferred embodiments of the present invention, but it is to be understood that the examples are given by way of illustration only and not of limitation. Parts by weight in these examples bear the same relation to parts by volume as do grams to millilitres.

*Example 1*

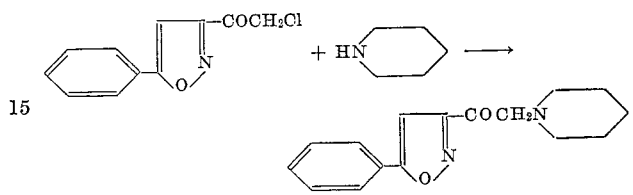

To a solution of 3-chloroacetyl-5-phenylisoxazole (50.0 parts by weight) in benzene (1500 parts by volume), there is added a solution of piperidine (48.2 parts by weight) in benzene (500 parts by volume) while stirring at 30° C. Stirring is continued at 50° C. for 30 minutes. After cooling, the separated substance is collected by filtration and washed with benzene. The filtrate is combined with the washing benzene, and dried hydrogen chloride is passed through the mixture. The precipitate is collected by filtration, washed with benzene and dried. The resulting substance is dissolved in water (3000 parts by volume) at 50° C. and then filtered. The filtrate is made alkaline with 20% sodium hydroxide solution. The precipitated crystals are collected by filtration, dried and recrystallized from ethanol to give 3-piperidinoacetyl-5-phenylisoxazole (34.6 parts by weight) as pale yellow prisms melting at 147 to 148° C. (decomp.).

*Analysis.*—Calcd. for $C_{16}H_{18}O_2N_2$: C, 71.09; H, 6.71; N, 10.36. Found: C, 71.48; H, 6.67; N, 10.26.

The hydrochloride is constituted by colorless needles melting at 178 to 179° C. (decomp.), when crystallized from a mixture of methanol and acetone.

*Analysis.*—Calcd. for $C_{16}H_{18}O_2N_2 \cdot HCl$: C, 62.63; H, 6.24; N, 9.13. Found: C, 63.03; H, 6.39; N, 9.03.

The starting material of this example, 3-chloroacetyl-5-phenylisoxazole, is prepared by reacting 3-chlorocarbonyl-5-phenylisoxazole with diazomethane in ether at room temperature and reacting the resulting 3-diazoacetyl-5-phenylisoxazole with dried hydrogen chloride in chloroform at room temperature.

*Example 2*

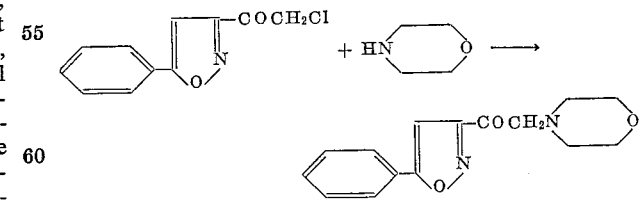

To a solution of 3-chloroacetyl-5-phenylisoxazole (11.0 parts by weight) in benzene (400 parts by volume), there is added a solution of morpholine (15.0 parts by weight) in benzene (200 parts by volume) while stirring at 30 to 35° C., and the resulting mixture is stirred at 50 to 55° C. for 2 hours. The reaction mixture is cooled with ice and filtered. The filtrate is concentrated under reduced pressure. The residue is extracted with acetone. The acetone extract is acidified with ethanolic hydrochloric acid. The precipitate is collected by filtration, washed with acetone and dissolved in water. The resulting solution is made alkaline with 20% sodium hydroxide solution. The precipitated crystals are collected by filtration and recrystallized from methanol to give 3-morpholinoacetyl-5-phenylisoxazole (7.3 parts by weight) as pale yellow plates melting at 134 to 135° C.

Analysis.—Calcd. for $C_{15}H_{16}O_3N_2$: C, 66.16; H, 5.92; N, 10.92. Found: C, 66.34; H, 5.99; N, 9.99.

The hydrochloride is constituted by colorless plates melting at 184 to 185° C. (decomp.), when crystallized from 70% aqueous ethanol.

Analysis.—Calcd. for $C_{15}H_{16}O_3N_2 \cdot HCl$: C, 59.91; H, 5.34; N, 8.74. Found: C, 59.95; H, 5.51; N, 8.60.

*Example 3*

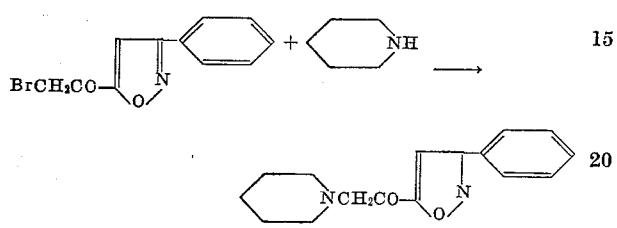

To a solution of 3-phenyl-5-bromoacetylisoxazole (10 parts by weight) in dry ether (300 parts by volume), there is added a solution of piperidine (8.1 parts by weight) in dry ether (80 parts by volume) while stirring and ice-cooling, and the resulting mixture is stirred at 30° C. for 10 minutes. The reaction mixture is cooled with ice and filtered. The collected substance is washed with dry ether. The filtrate is combined with the washing ether and thereto is added a mixture of ethanol and hydrochloric acid. The precipitate is collected by filtration, washed with ether, dried and recrystallized from ethanol to give 3-phenyl-5-piperidinoacetylisoxazole hydrochloride (9.5 parts by weight) as colorless prisms melting at 223.5 to 225° C. (decomp.).

Analysis.—Calcd. for $C_{16}H_{18}O_2N_2 \cdot HCl$: C, 62.64; H, 6.20; N, 9.14. Found: C, 62.35; H, 6.19; N, 8.79.

The starting material of this example, 3-phenyl-5-bromoacetylisoxazole, is prepared by reacting 3-phenyl-5-chlorocarbonylisoxazole with diazomethane in ether at room temperature and reacting the resulting 3-phenyl-5-diazoacetylisoxazole with dried hydrogen bromide in chloroform at room temperature.

*Example 4*

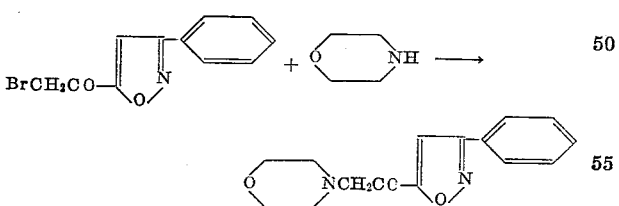

To a solution of 3-phenyl-5-bromoacetylisoxazole (133 parts by weight) in benzene (4000 parts by volume), there is added a solution of morpholine (110 parts by weight) in benzene (1000 parts by volume) while stirring at room temperature, and the resulting mixture is stirred at 40° C. for 15 minutes. The reaction mixture is cooled with ice and filtered. The collected substance is washed with benzene. The filtrate is combined with washing benzene. The filtrate is combined with washing benzene and concentrated. The residue is extracted with acetone. The acetone extract is acidified with a mixture of ethanol and hydrochloric acid. The precipitate is collected by filtration, washed with acetone and dissolved in water. The resulting solution is made alkaline with 10% sodium hydroxide solution. The precipitated crystals are collected by filtration and recrystallized from methanol to give 3-phenyl-5-morpholinoacetylisoxazole (92 parts by weight) as pale yellow prisms melting at 137 to 138° C.

Analysis.—Calcd. for $C_{15}H_{16}O_3N_2$: C, 66.18; H, 5.88; N, 10.29. Found: C, 66.30; H, 5.95; N, 10.10.

The hydrochloride is constituted by colorless needles melting at 211 to 212° C. (decomp.), when crystallized from 75% ethanol.

Analysis.—Calcd. for $C_{15}H_{16}O_2N_2 \cdot HCl$: C, 58.35; H, 5:55; N, 9.08. Found: C, 57.90; H, 5.70; N, 8.62.

*Example 5*

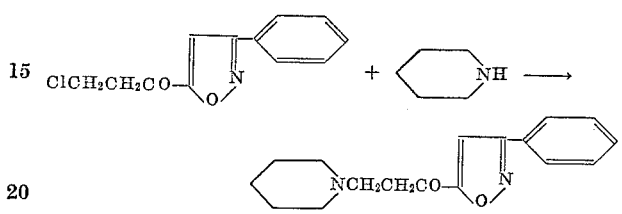

To a solution of 3-phenyl-5-(3-chloropropionyl)-isoxazole (110 parts by weight) in anhydrous ether (3000 parts by volume), there is added a solution of piperidine (98 parts by weight) in anhydrous ether (1000 parts by volume) while stirring at room temperature, and the resulting mixture is stirred at 40° C. for 15 minutes. The reaction mixture is cooled with ice and filtered. The collected substance is washed with anhydrous ether. The filtrate is combined with the washing ether and thereto is added a mixture of ethanol and hydrochloric acid. The precipitate is collected by filtration, washed with ether and dissolved in water. The resulting solution is made alkaline with 10% sodium hydroxide solution and extracted with ether. The extract is washed with water, dried over anhydrous potassium carbonate and concentrated. The residue is crystallized from petroleum benzin to give 3-phenyl-5-(3-piperidinopropionyl)-isoxazole (33 parts by weight) as colorless plates melting at 93 to 94° C.

Analysis.—Calcd. for $C_{17}H_{20}O_2N_2$: C, 71.80; H, 7.09; N, 9.85. Found: C, 71.87; H, 7.31; N, 9.88.

The hydrochloride is constituted by colorless plates melting at 195 to 196° C, when crystallized from 95% aqueous ethanol.

Analysis.—Calcd. for $C_{17}H_{20}O_2N_2 \cdot HCl$: C, 63.64; H, 6.60; N, 8.73. Found: C, 63.47; H, 6.68; N, 8.58.

The starting material of the example, 3-phenyl-5-(3-chloropropionyl)-isoxazole, is prepared by reacting 3-phenyl-5-chlorocarbonylisoxazole with ethylene in the presence of a Lewis acid as catalyst.

*Example 6*

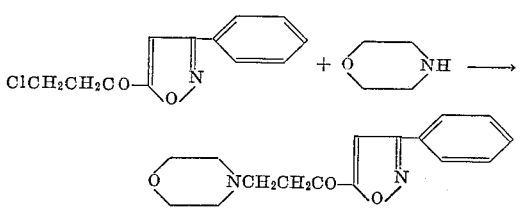

To a solution of 3-phenyl-5-(3-chloropropionyl)-isoxazole (131 parts by weight) in benzene (4000 parts by volume), there is added a solution of morpholine (160 parts by weight), in benzene (1000 parts by volume) while stirring at room temperature, and the resulting mixture is stirred at 40° C. for 20 minutes. The reaction mixture is cooled with ice and filtered. The collected substance is washed with benzene. The filtrate is combined with the washing benzene and concentrated under reduced pressure. The residue is extracted with acetone. The acetone extract is acidified with a mixture of ethanol and hydrochloric acid. The precipitate is collected by filtration, washed with acetone, dried and dissolved in water. The resulting solution is made alkaline with 10% sodium hydroxide solution and extracted with ether. The extract is washed with water, dried over anhydrous potassium carbonate and concentrated. The residue is crystallized from ligroin to give 3-phenyl-5-(3-morpholinopropionyl)-isoxazole (121 parts by weight) as colorless prisms melting at 103 to 105° C.

*Analysis.*—Calcd. for $C_{16}H_{18}O_2N_3$: C, 67.11; H, 6.34; N, 9.78. Found: C, 67.61; H, 6.54; N, 9.28.

*Example 7*

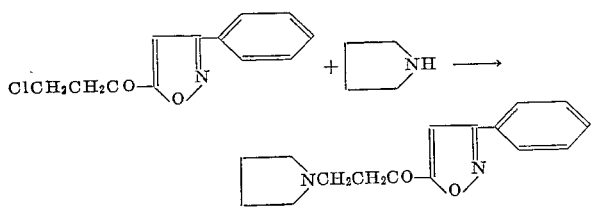

To a solution of 3-phenyl-5-(3-chloropropionyl)-isoxazole (124 parts by weight) in benzene (4000 parts by volume), there is added a solution of pyrrolidine (90 parts by weight) in benzene (1000 parts by volume), while stirring, and the resulting mixture is stirred at room temperature for 15 minutes. The reaction mixture is cooled with ice and filtered. The collected substance is washed with benzene. The filtrate is combined with the washing benzene and concentrated under reduced pressure. The residue is extracted with acetone. The acetone extract is acidified with a mixture of ethanol and hydrochloric acid. The precipitate is collected by filtration, washed with acetone, dried and dissolved in water. The resulting solution is made alkaline with 10% sodium hydroxide solution and extracted with ether. The extract is washed with water, dried over anhydrous potassium carbonate and concentrated. The residue is crystallized from petroleum benzin to give 3-phenyl-5-(3-pyrrolidinopropionyl)-isoxazole (93 parts by weight) as pale yellow prisms melting at 81 to 82° C.

*Analysis.*—Calcd. for $C_{16}H_{18}O_2N_2$: C, 71.09; H, 6.71; N, 10.36. Found: C, 71.36; H, 6.88; N, 10.11.

The hydrochloride is constituted by colorless needles melting at 164 to 165° C., when crystallized from ethanol.

*Analysis.*—Calcd. for $C_{16}H_{18}O_2N_2 \cdot HCl$: C, 62.64; H, 6.24; N, 9.13. Found: C, 61.97; H, 6.45; N, 8.93.

*Example 8*

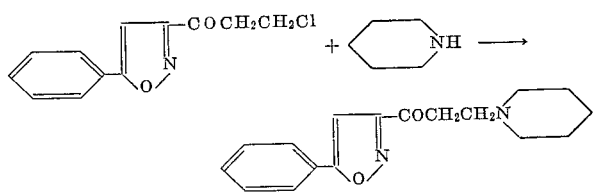

To a solution of 3-(3-chloropropionyl)-5-phenylisoxazole (50.0 parts by weight) in benzene (1500 parts by volume), there is added a solution of piperidine (45 parts by weight) in benzene (500 parts by volume) while stirring at 30° C. Stirring is continued at 50° C. for 30 minutes. After cooling, the separated substance is collected by filtration and washed with benzene. The filtrate is combined with the washing benzene and concentrated under reduced pressure. The residue is extracted with acetone. The acetone extract is acidified with ethanolic hydrochloric acid. The precipitate is collected by filtration, washed with acetone and dissolved in water. The resulting solution is made alkaline with 10% sodium hydroxide solution. The precipitated crystals are collected by filtration and recrystallized from petroleum benzin to give 3-(3-piperidinopropionyl)-5-phenylisoxazole (32.3 parts by weight) as crystals melting at 93 to 96.5° C.

The starting material of the example, 3-(3-chloropropionyl)-5-phenylisoxazole, is prepared by reacting 3-chlorocarbonyl-5-phenylisoxazole with ethylene in the presence of a Lewis acid as catalyst.

*Example 9*

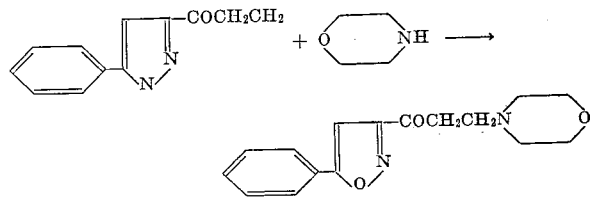

To a solution of 3-(3-chloropropionyl)-5-phenylisoxazole (30 parts by weight) in benzene (900 parts by volume), there is added a solution of morpholine (38 parts by weight) in benzene (400 parts by volume) while stirring at 30° C., and the resultant mixture is stirred at 50° C. for 30 minutes. The reaction mixture is treated as in Example 3 and the resulted crude crystals are recrystallized from ligroin to give 3-(3-morpholinopropionyl)-5-phenylisoxazole (19.2 parts by weight) as crystals melting at 111.5 to 113° C.

What is claimed is:

1. A member selected from the group consisting of compounds of the formula:

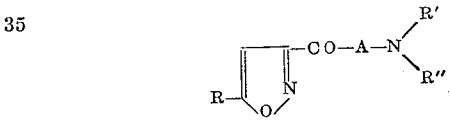

and pharmaceutically acceptable non-toxic salts thereof, wherein R is a member selected from the group consisting of phenyl, lower alkylphenyl, lower alkoxyphenyl and halophenyl, R' and R" each is a member selected from the group consisting of hydrogen and lower alkyl and R' and R" together represent a member selected from the group consisting of tetramethylene, pentamethylene, hexamethylene, oxatetramethylene, oxapentamethylene, oxahexamethylene, azatetramethylene, azapentamethylene, azahexamethylene, thiatetramethylene, thiapentamethylene and thiahexamethylene, and A is lower alkylene.

2. A member selected from the group consisting of compounds of the formula:

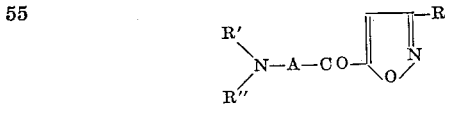

and pharmaceutically acceptable non-toxic salts thereof, wherein R is a member selected from the group consisting of phenyl, lower alkylphenyl, lower alkoxyphenyl and halophenyl, R' and R" each is a member selected from the group consisting of hydrogen and lower alkyl and R' and R" together represent a member selected from the group consisting of tetramethylene, pentamethylene, hexamethylene, oxatetramethylene, oxapentamethylene, oxahexamethylene, azatetramethylene, azapentamethylene, azahexamethylene, thiatetramethylene, thiapentamethylene and thiahexamethylene, and A is lower alkylene.

3. 3-(ω-piperidino(lower)alkanoyl)-5-phenylisoxazole.

4. 3-(ω-morpholino(lower)alkanoyl)-5-phenylisoxazole.

5. 3-phenyl-5-(ω-piperidino(lower)alkanoyl)-isoxazole.

6. 3-phenyl-5-(ω-morpholino(lower)alkanoyl)-isoxazole.
7. 3-phenyl-5-(ω-pyrrolidino(lower)alkanoyl)-isoxazole.
8. 3-piperidinoacetyl-5-phenylisoxazole.
9. 3-morpholinoacetyl-5-phenylisoxazole.
10. 3-(3-piperidinopropionyl)-5-phenylisoxazole.
11. 3-(3-morpholinopropionyl)-5-phenylisoxazole.
12. 3-phenyl-5-piperidinoacetylisoxazole.
13. 3-phenyl-5-morpholinoacetylisoxazole.
14. 3-phenyl-5-(3-piperidinopropionyl)-isoxazole.
15. 3-phenyl-5-(3-morpholinopropionyl)-isoxazole.
16. 3-phenyl-5-(3-pyrrolidinopropionyl)-isoxazole.

No references cited.

ALEX MAZEL, *Primary Examiner*.
JOSE TOVAR, *Assistant Examiner*.